INVENTOR.
GIORGIO LUZZATTO

INVENTOR.
GIORGIO LUZZATTO

INVENTOR.
GIORGIO LUZZATTO

INVENTOR.
GIORGIO LUZZATTO

United States Patent Office 3,378,769
Patented Apr. 16, 1968

3,378,769

HETERODYNE GENERATORS IN MICROWAVE RADIO SYSTEM REPEATERS

Giorgio Luzzatto, Genoa, Italy, assignor to Società Italiana Telecomunicazioni Siemens S.p.A.

Filed Mar. 18, 1965, Ser. No. 440,690
Claims priority, application Italy, Mar. 24, 1964, 6,545/64
2 Claims. (Cl. 325—11)

ABSTRACT OF THE DISCLOSURE

A heterodyne generator of oscillations at frequency $f_T$ and $f_T \pm f_S$ in radio-link repeaters comprises a quartz-stabilized local oscillator, followed by an amplifier and a chain of frequency multiplier elements disposed in series, whose output frequency has the value $f_T$; a quartz-stabilized shift oscillator whose signal at frequency $f_S$ is coupled to the diode of the last multiplier element; and two filters derived at the output of the last multiplier whose pass-band corresponds respectively to that of the two heterodyne frequencies $f_T$ and $f_T \pm f_S$.

This invention relates to multichannel radio link transmitters, and more particularly to the heterodyne generator employed therein.

Present day multi-link communication systems employ frequency conversion operation, for transmission and reception. The transmitter heterodyne oscillators used for frequency conversion, require, in some cases, power levels of different values (of the order of 20 db), and must supply constant frequency differences. In some applications, as in frequency-diversity systems, the frequency generators must maintain the value of the frequency-difference generated strictly constant.

The intermediate station (transmitter-receiver) in multichannel radio links, utilizes the following method: the transmitter heterodyne oscillator uses a stabilized oscillator of adequately high power (0.3–0.5 watt) and often this is a crystal-controlled oscillator followed by a frequency multiplier chain in which each multiplier element, generally constituted by a non-linear element, for example a varactor diode, is preceded by a filter which permits the passage of a signal having the same frequency as that of the input signal and is followed by another filter which permits the passage of a signal at a frequency $m$-times greater than that of the input, in which $m$ is the coefficient of multiplication. In the microwave art, these filters are generally provided by hollow space resonators. A crystal (such as quartz) controlled fixed frequency oscillator is also included in the system. By mixing, in a suitable converter, a portion of the signal supplied by the transmitter power generator (transmitter oscillator), with the signal supplied by the quartz-controlled oscillator, whose resonant frequency is the difference between two of the required heterodyne frequencies, there is selected, among the undesired mixing products, by means of a suitable filter, the frequency corresponding to the sum or to the difference between the two frequencies present at the input of the converter, as required. The advantages of this solution are: to render the transmitter frequency independent of the heterodyne generator frequency shift; to restrict the frequency instability within very narrow limits and to diminish the noise which is always present in the heterodyne generator output.

While in the above mentioned case the frequencies generated by the heterodyne oscillators are mixed at the output of said generators, the aim of the present invention is to introduce the frequency-difference signal at any point of the multiplier chain, and preferably at the input of the last multiplier stage, which stage therefore assumes the task of a multiplier and a converter.

This arrangement simplifies the equipment and a saving in expense and devices is obtained, particularly by the fact that presently semiconductors are used for heterodyne generators.

The above indicated and various other features and objects of the present invention will appear from the following description given by way of example and not of limitation, with reference to the attached drawings, in which.

Figure 3A:
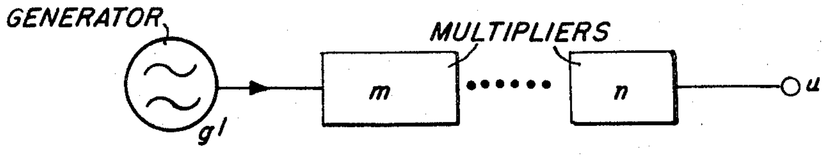
Figure 3B:
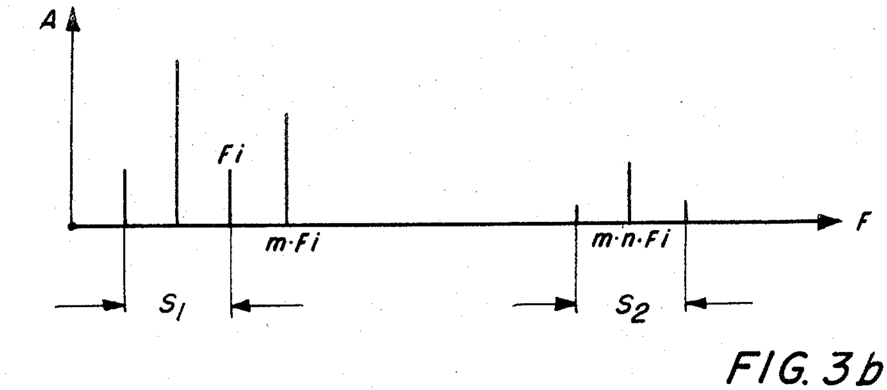

FIGURE 3*a* is a block diagram of a frequency multiplier and FIGURE 3*b* discloses the relative input and output frequency spectrum.

Figure 4A:
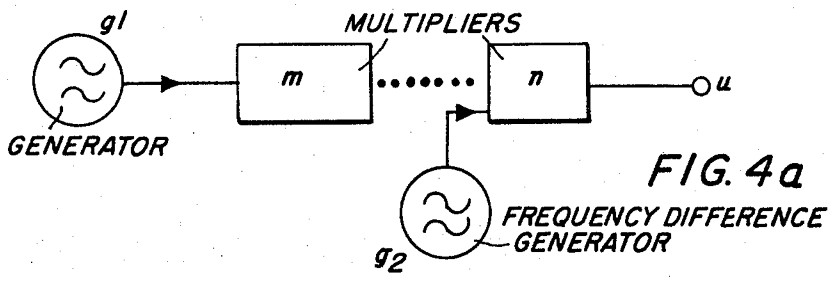
Figure 4B:
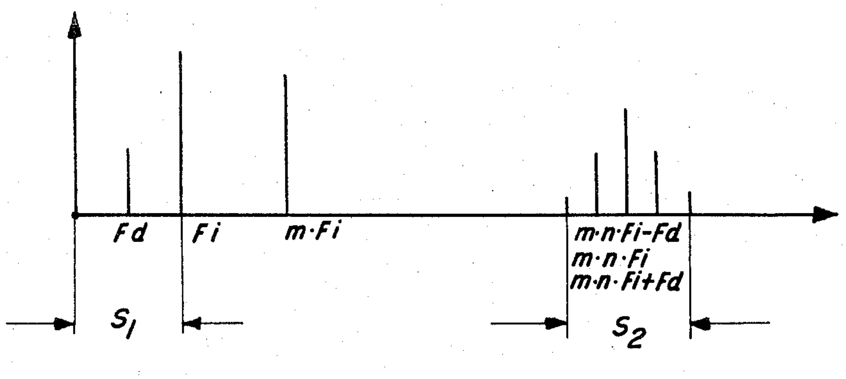

FIGURE 4*a* is a block diagram of a frequency multiplier which has a frequency-difference generator output in accordance with the present invention, and FIGURE 4*b* discloses the relative input and output frequency spectrum.

Figure 5A:
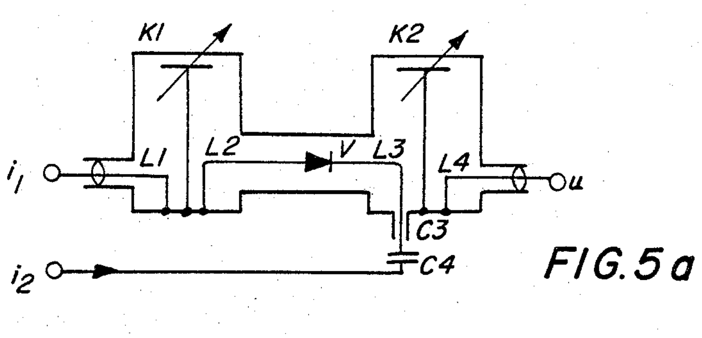
Figure 5B:
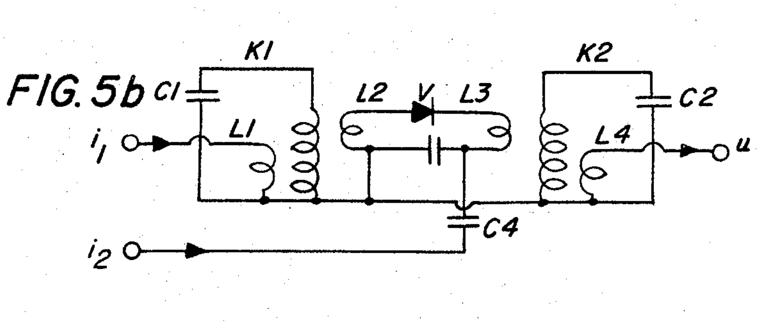

FIGURES 5*a* and 5*b* shows an arrangement, in schematic form, (5*a*) employing cavity resonators and the equivalent electric circuit (*b*), in accordance with the invention.

Figures 6A, 6B:
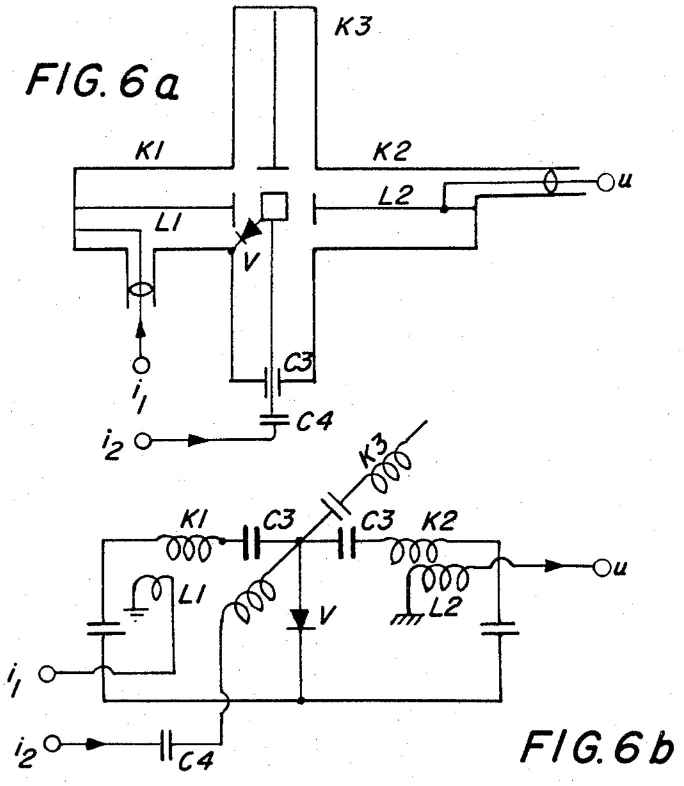

FIGURE 6*a* shows a different cavity arrangement and FIGURE 6*b* shows the equivalent electric circuit in accordance with the invention.

Figure 7:
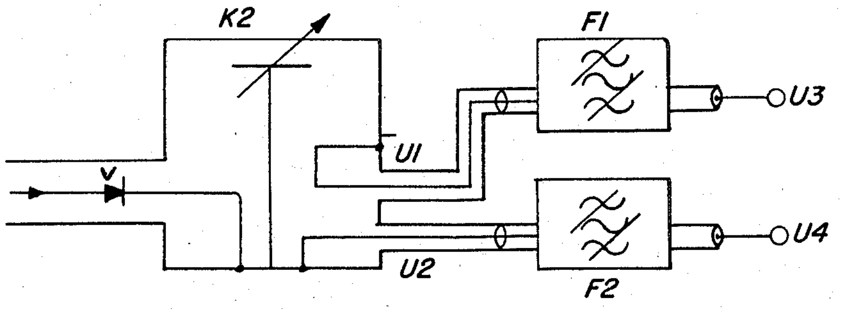

FIGURE 7 shows an output stage using a cavity resonator provided with two separate outputs, each resonator connected to an individual pass-band filter.

Figure 8:
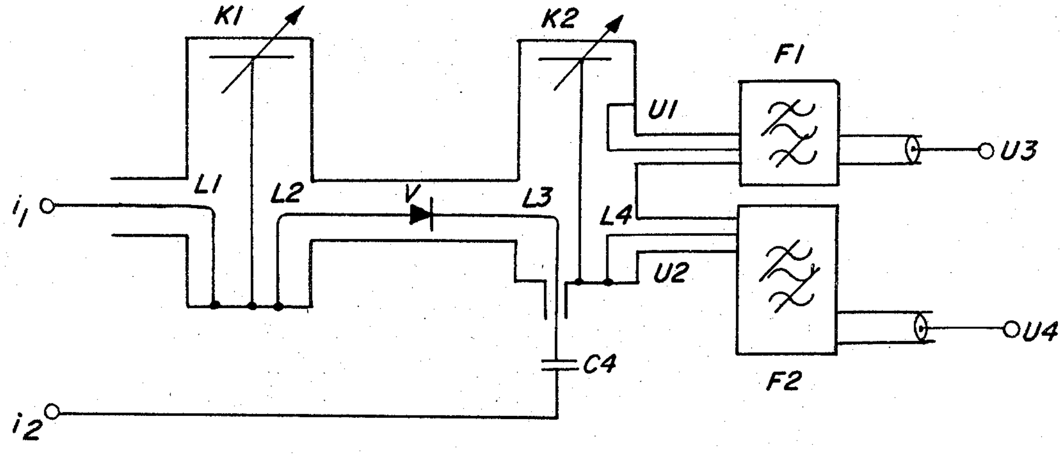

FIGURE 8 is a cavity resonator in accordance with the invention as illustrated in FIGURE 5*a* having two separate outputs as illustrated in FIGURE 7.

Figure 1:
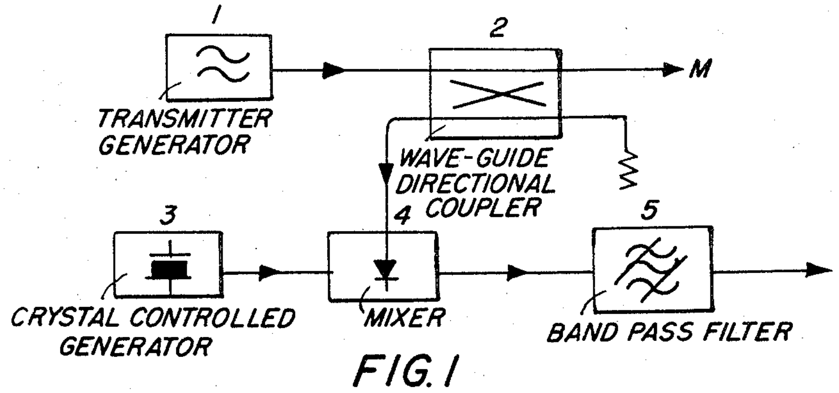
FIG. 1 PRIOR ART
FIGURE 1 is a partial block diagram of a circuit showing the connections to the various elements forming the heterodyne generator of a known transmitter-receiver.

For the best understanding of the above-mentioned characteristics of the present invention, in FIG. 1 are shown the elements forming the first stages of an intermediate radio-link station, which is taken into consideration to explain the scope of our invention.

The output of the transmitter heterodyne generator 1 is fed to a wave-guide directional coupler 2 connected to the transmiter-mixer (not shown). A portion of the transmitter signal, derived from the directional coupler 2, is mixed, by means of mixer 4, with the signal coming from a crystal controlled generator 3, the resonant frequency of the mixer 4 representing the sum and difference between the two input heterodyne frequencies. The output from mixer 4 is fed to a pass-band filter 5 which selects the frequency corresponding to the sum or the difference of the two incoming frequencies, said frequency being injected into the receiver-mixer (not shown).

Figure 2:
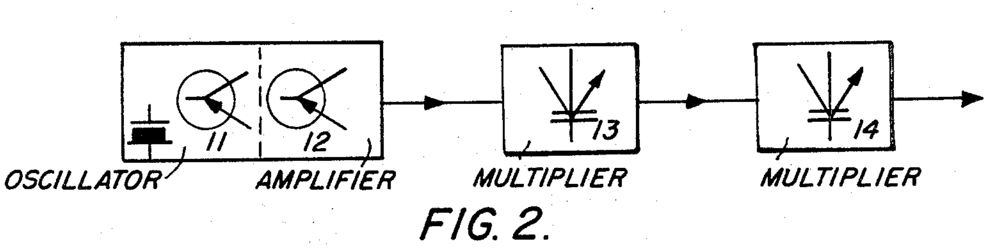
FIGURE 2 shows a block diagram of a transistorized oscillator-amplifier and the relative frequency multipliers using "varactors."

The recent use of semiconductive elements in the design of micro-wave generators is schematically shown in FIG. 2. The transmitter-oscillator 11 is always connected to an amplifier 12, both using transistors. The multiplier stages 13 and 14 make use of diodes (varactors).

According to the present invention, the signal at the frequency equal to the required frequency difference, is fed to the last multiplier stage which thus works as a multiplier and a converter.

Referring now to FIG. 3, there is shown the frequency spectrum-S1–S2 and the signal amplitude A, as seen through the multiplier stages and at the output $u$ of a frequency multiplier unit. The elements $m$ and $n$ represent multiplier stages.

FIG. 3*b* shows the frequency spectrum S1 and amplitude A, as they appear at the input and the frequency spectrum S2 as it appears at the output of a frequency-multiplier and converter of a known type heterodyne-generator unit, while in FIG. 4*b* are shown the frequency spectrum and signal amplitude as they appear at the input and at the output of a multiplier converter unit in accordance with the present invention. In the block schematic diagram of FIG. 4*a*, the frequency-difference generator *g*2 is connected to the last multiplier stage *n*. Stage *m* is a further multiplier stage in a multiplier stage chain.

As mentioned before, the system disclosed provides a more simple and economical arrangement with respect to the known type transmitter illustrated in FIG. 1, maintaining however all the features of the previous type transmitter. This is obtained by connecting one of the transmitter generators to the desired multiplier stage (e.g. the last) and feeding thereto the frequency difference signal.

FIGURE 5 (*a–b*) shows the invention applied to a cavity resonator stage. The signal at input frequency *fi* is fed to input *i*1) of a cavity K1 resonant at frequency *fi*. The output of cavity K1 is fed to the input of a second cavity K2, resonant at the frequency *nfi*, through a varactor V, across which are applied signal voltages at frequencies *fi* and along input *i*2, the frequency $f_S$ by means of magnetic couplings L1, L2, L3. Inductor L3, inside cavity K2, has the cold end isolated therefrom but connected thereto via a bypas capacitor C3. A blocking capacitor C4 isolates the varactor from D.C. The signal at frequency-difference *fd* is fed through *i*2. It is obvious that the signal at $f_S$ could be also fed to the input side of the cavity.

Cavity K2 resonates at *nfi* frequency. The signal at the output *u* contains the frequency *nfi* and the conversion frequency products $nfi+rf_S$ and $nfi-rf_S$ (where *r* is an integral positive number) which the selectivity characteristic of the output cavity can not stop.

FIG. 6 (*a–b*) shows a further method and apparatus for application of this invention to multiple branch cavities. The varactor *v* here has the base connected to the ground and the other electrode collects simultaneously the currents of frequency *fi* from input *i*1 and $f_S$ from input *i*2. Branch cavity K3 is an idler cavity.

FIG. 7 shows a practical method to extract the two frequencies from the final cavity K2; which carries two coaxial outputs (*u*1–*u*2) connected to two band-pass filters F1 and F2: F1 for the band $fi+f_S$ or $fi-f_S$, and F2 for the band *nfi*, which respectively appear at the outputs U3 and U4.

FIGURE 8 is a combination of FIGS. 5*a* and 7 and the same nomenclature is maintained for FIGURE 8 as for FIGS. 5*a* and 7. Specifically, the cavity K2 of FIG. 5*a* is provided with two outputs U1 and U2 and two band-pass filters F1 and F2 as illustrated in FIG. 7.

Obviously, many modifications of the structural embodiments of the essential invention concept, can be made. It is therefore to be understood that, within the scope of the appended claims, the invention may be practiced otherwise than as specifically described.

What is claimed is:

1. A heterodyne generator of two oscillations at frequency $f_T$ and $f_T \pm f_S$ in radio-link repeaters, comprising in combination a quartz-stabilized oscillator of frequency $f_{T/N}$ an amplifier, a chain of frequency multiplier elements having an input and an output, the last multiplier having an output frequency N times the input frequency applied to said first multiplier input, said oscillator being connected in series with said amplifier and said chain of frequency multiplier elements, said last multiplier element having a filter and a diode, $f_T$ being the frequency selected by the filter of the last multiplier element; a second quartz-stabilized oscillator whose generated shift frequency $f_S$ is coupled with the diode of the last multiplier element of the chain; and two filters, said two filters being coupled to the output of the last multiplier, whose pass-band corresponds respectively to that of the two frequencies $f_T$ and $f_T \pm f_S$.

2. A heterodyne generator as claimed in claim 1, the last multiplier having an output cavity, said output cavity having two outputs, each output being connected respectively to the pass-band filters $f_T$ and $f_T \pm f_S$.

References Cited

UNITED STATES PATENTS

| | | | |
|---|---|---|---|
| 3,046,410 | 7/1962 | Robinson | 325—449 X |
| 3,094,672 | 6/1963 | Lewis et al. | 325—445 X |
| 3,163,781 | 12/1964 | Barringer | 328—16 X |
| 3,188,483 | 6/1965 | Steiner | 328—16 X |
| 3,195,062 | 7/1965 | Murakami | 330—4.9 |
| 3,226,645 | 12/1965 | Harwood et al. | 325—445 |

ROBERT L. GRIFFIN, *Primary Examiner.*

JOHN W. CALDWELL, *Examiner.*